United States Patent [19]
Skerry

[11] 3,921,965
[45] Nov. 25, 1975

[54] LEAF SPRINGS
[75] Inventor: Peter Skerry, Leeds, England
[73] Assignee: Jonas Woodhead Limited, Leeds, England
[22] Filed: Oct. 1, 1973
[21] Appl. No.: 402,077

[30] Foreign Application Priority Data
Oct. 3, 1972 United Kingdom............ 45508/72

[52] U.S. Cl................................ 267/47; 267/54 R
[51] Int. Cl.²........................................ B60G 11/16
[58] Field of Search............... 267/54 R, 47; 74/470

[56] References Cited
UNITED STATES PATENTS
| | | | |
|---|---|---|---|
| 465,661 | 12/1891 | Evans | 267/54 R |
| 1,354,978 | 10/1920 | Krafve | 267/54 R |
| 1,538,188 | 5/1925 | Hopper et al. | 267/47 |
| 1,546,896 | 7/1925 | Herbert | 267/47 |
| 1,776,442 | 9/1930 | Lessing | 267/47 |
| 2,031,954 | 2/1936 | Jandus | 267/54 R |
| 3,580,347 | 5/1971 | McGee | 267/54 R |

FOREIGN PATENTS OR APPLICATIONS
| | | | |
|---|---|---|---|
| 599,243 | 10/1925 | France | 267/54 R |
| 948,793 | 2/1944 | United Kingdom | 267/54 R |
| 1,138,159 | 1/1957 | France | 267/54 R |

Primary Examiner—Samuel Scott
Assistant Examiner—Wesley S. Ratliff, Jr.
Attorney, Agent, or Firm—Lowe, King & Price

[57] ABSTRACT

A multi-leaf vehicle spring comprising an uppermost leaf terminating in an end portion curled into an eye for receiving a shackle bush, and a lower leaf terminating in an end portion bent into a loop around the eye, the uppermost leaf being formed with a pair of projections below the eye between which projections the lower leaf is slidably located.

3 Claims, 7 Drawing Figures

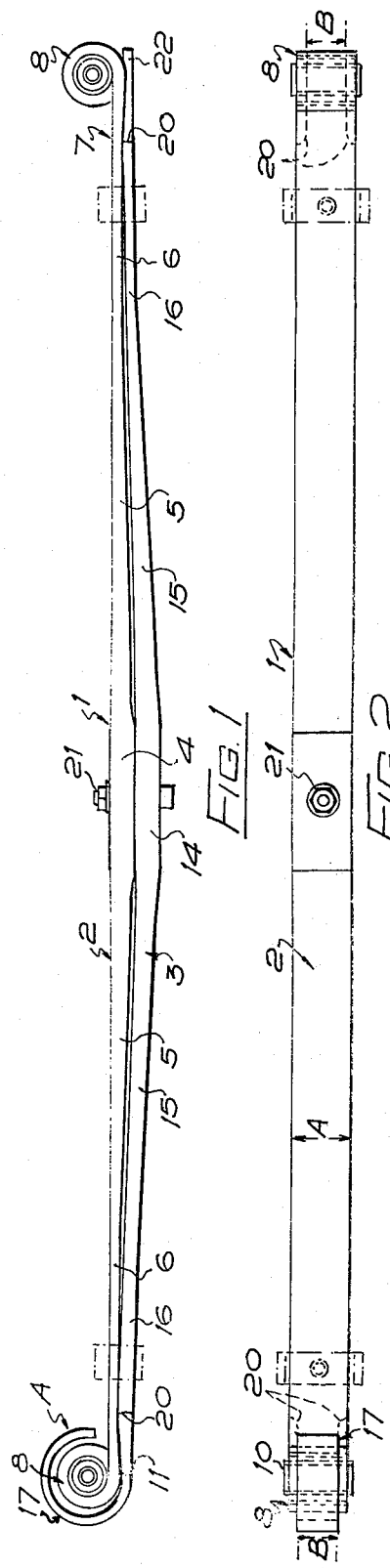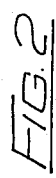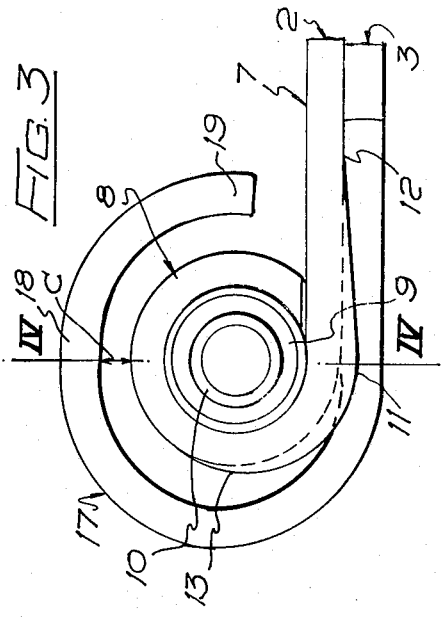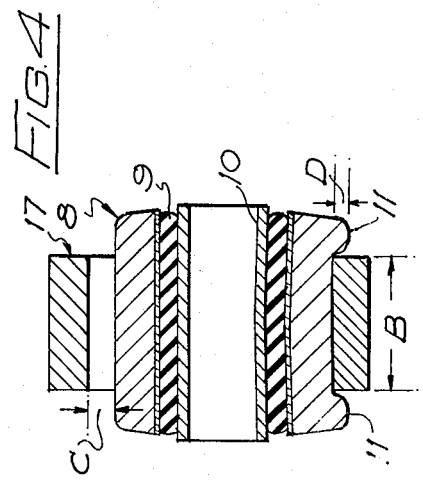

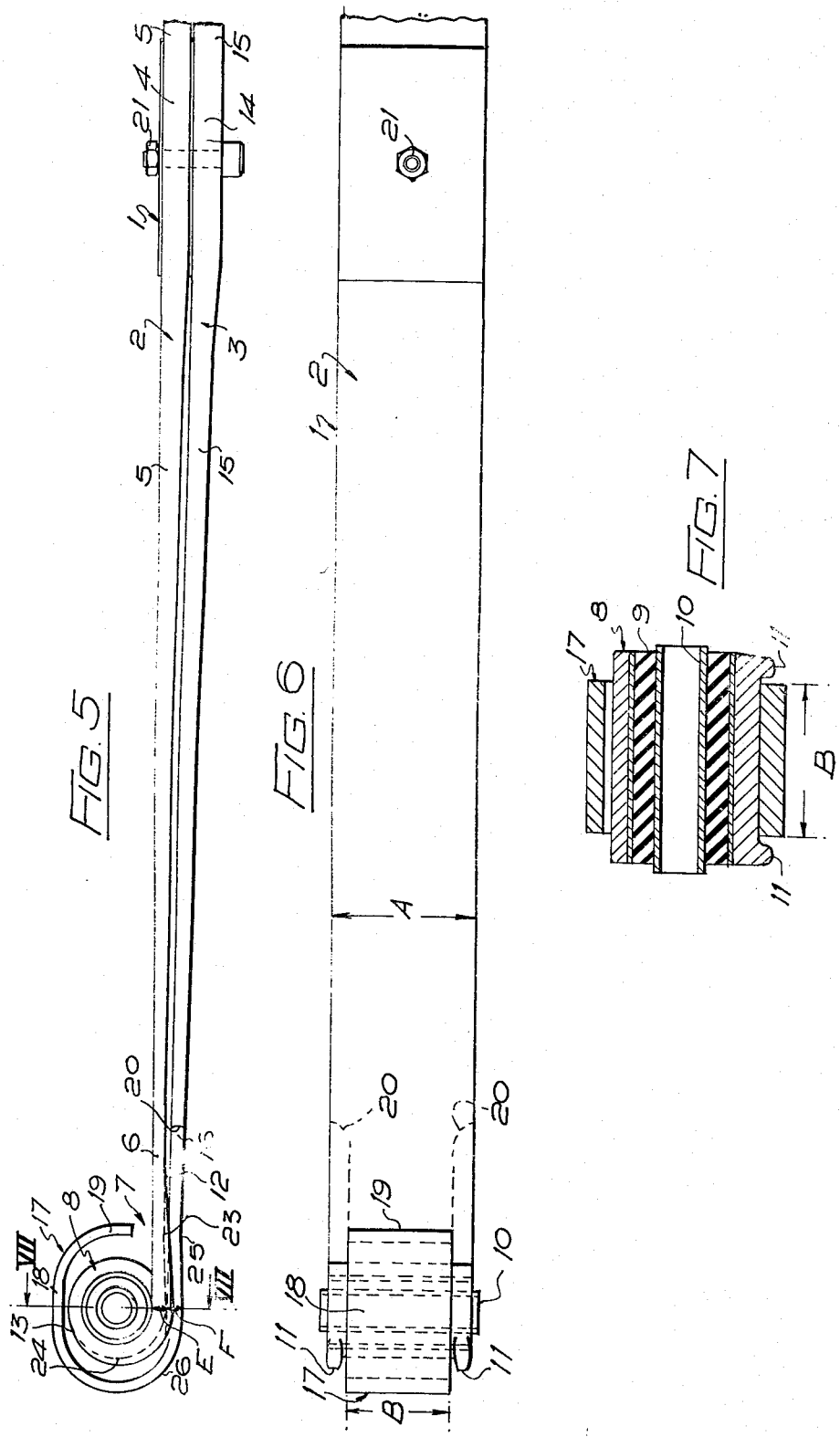

LEAF SPRINGS

This invention relates to leaf springs, more particularly multi-leaf springs (i.e. having two or more leaves) and has for its principal object the prevention of splaying of the leaves of such a spring when on a vehicle and as a result of cornering predominantly in one direction.

A secondary object is to provide increased strength round the root (or underside) of the eye of the uppermost leaf, which is the invariable failure position due to the horizontal forces acting on this leaf between the centre-bolt and the shackle bush through the eye.

Another object of the invention is to retain roundness of the eye of the uppermost leaf when it is stressed upon insertion of the shackle bush.

Yet another object is to provide allowance for wear at the contact position between the uppermost leaf and the leaf below it.

According to the present invention, a multi-leaf spring comprises an uppermost leaf having a main length terminating in an end portion curled into an eye for receiving a shackle bush, a lower leaf having a main length terminating in an end portion bent into a loop round the eye, the loop being elongated in the lengthwise direction of the spring leaves to provide a part parallel to the main length of the lower leaf leading to the loop and spaced therefrom by an amount not substantially greater than the corresponding outside dimension of the eye, and the uppermost leaf being formed with a pair of projections below the eye between which the lower leaf is able to slide.

Thus, with the middle portions of the spring leaves secured together, as by means of a centre-bolt through holes in the leaves, the close fit of the parallel portion of the loop of the lower leaf over the eye of the uppermost leaf causes the lower leaf to be constrained to remain between the projections below the eye of the uppermost leaf and, therefore, the only relative movement possible between the leaves is in the lengthwise direction (i.e. as is necessary when the springs are flexed) or, in other words, splaying of the leaves of the springs when on a vehicle is positively prevented by the restraint imposed by the projections.

The projections of the uppermost leaf are preferably ribs extending along the edges of the leaf in both directions from the root (or underside) of the eye, so as to provide increased strength against failure due to horizontal forces at the eye. The thickness of the uppermost leaf is preferably increased again extending in both directions from the root of the eye (i.e., between the ribs), to provide allowance for wear at the contact position between the leaves, as well as increasing the strength. The ribs and/or the thickening between the ribs also helps to retain roundness of the eye of the uppermost leaf when it is stressed upon insertion of a shackle bush.

The projections (or ribs) are preferably formed within the same overall width as the main length (and the eye) of the uppermost leaf and the end portion of the lower leaf is reduced in width to fit closely between the projections. The reduction in width of the end portion of the lower leaf conveniently extends to the end of the loop, which end is preferably bent (beyond the parallel portion of the loop) back towards the main length of the uppermost leaf, but preferably spaced from it.

The invention is applicable to multi-leaf springs with tapered (e.g. parabolic taper) leaves and both the ribs on the uppermost leaf and thickening between the ribs may be formed as part of a rolling operation for effecting the tapering, by providing grooves in a rolling die (to form the ribs) and a flat between the grooves (to form the thickening).

The lower leaf is preferably provided with a similar increase in thickness extending in both directions from the root of the loop (or the eye) to give added strength, as well as contributing to the allowance for wear at the contact postion, by using the same rolling die as for the uppermost leaf and then cropping of the ribs (and beyond) to reduce the width of the end portion of the lower leaf (including the loop) to fit between the ribs on the uppermost leaf.

The other ends of the leaves can be similarly provided with projections (or ribs) extending from an eye and with a loop fitting over the eye and between the projections (or ribs), or alternatively, the lower leaf may terminate in a straight end portion fitting between the projections.

The invention will now be described in greater detail, by way of example, with reference to the accompanying drawings, in which:

FIG. 1 is a side elevation of a first embodiment of two leaf spring according to the invention;

FIG. 2 is a plan view of FIG. 1;

FIG. 3 is a view of part A of FIG. 1 to a larger scale;

FIG. 4 is a section on the line IV to IV of FIG. 3;

FIG. 5 is a side elevation of the left hand side of a second embodiment of a two leaf spring according to the invention, the right hand side being identical;

FIG. 6 is a plan view of FIG. 1; and

FIG. 7 is a section on the line VII to VII.

In both embodiments like reference numerals are given to like component parts.

A multi-leaf spring 1 is made up of two leaves viz. an uppermost leaf 2 and a lower leaf 3. The uppermost leaf 2 is of constant width A and comprises a relatively thick centre portion 4, from which there extend in both directions portions 5 having a parabolically tapering thickness and thereafter portions 6 of constant thickness, the portions 4, 5 and 6 constituting the main length of the leaf, which main length terminates at each end of the leaf at end portions 7, each of which is curled into an eye 8 into which is fitted a resilient sleeve 9 and a bush 10 for a shackle, by which the spring is to be attached to a vehicle for example. Below the eye 8 the end portion 7 is provided with a pair of downwardly projecting ribs 11 within the width A of the leaf 2, the ribs 11 extending along the edges of the leaf 2 so that in one direction, the ribs 11 run into the portion 7 to terminate at 12 and in the other direction the ribs run into the eye 8 to terminate at 13.

The lower leaf 3 similarly comprises a relatively thick centre portion 14, from which there extend in both directions, portions 15 having a parabolically tapering thickness, and thereafter portions 16 of constant thickness, the portions 14, 15 and 16 constituting the main length of the leaf.

In the first embodiment of the invention, the left hand end of the lower leaf 3 terminates, beyond the portion 16 in a loop 17 extending round the eye 8, the loop having a part 18 parallel to the upper surface of the main length of the lower leaf and terminating in an end 19 bent back towards the leaf 2. The lower leaf 3 also has a width A over its main length but this is reduced to width B for the loop 17, the reduction being effected at shoulders 20. The parallel portion 18 is spaced from the loop 8 by a distance C while the ribs 11 project downwardly from the leaf 2 by a distance D. The leaves 2 and 3 are each provided with co-axial holes in their centre portions 4 and 14 through which passes a centre-bolt 21 to secure the leaves together.

The right hand end of the lower leaf 3, in contrast to the left hand end, is not provided with a loop 17, but terminates in a straight end portion 22, also of width B. It will be appreciated that movement of one spring leaf with respect to the other about the centre-bolt is constrained by the limitation of movement imposed on the lower leaf 3 by the ribs 11.

In the second embodiment, only one end of the spring is illustrated, for the other end is identical. Thus in contrast to the first embodiment, both ends of the lower leaf 3 are provided with a loop 17. Also, the portion 7 in the region of the eye 8 has its thickness increased, to dimension E between points 23 and 24, compared with the adjacent portion 6, which increased in thickness provides an allowance for wear at the contact position between the leaves 2 and 3. Similarly, the lower leaf 3 in the region of the eye 8 is also provided with a portion of increased thickness F between points 25 and 26 compared with the adjacent portion, to give added strength as well as providing an allowance for wear at the contact position.

What I claim is:

1. A multi-leaf spring comprising:
   a. an uppermost leaf, said uppermost leaf having a main length, an end portion and an eye curled from said end portion,
   b. a lower leaf, said lower leaf having a main length, an end portion and a loop bent from said end portion and extending around said eye, said loop being elongated in the lengthwise direction of the spring leaves to provide a part parallel to said main length of said lower leaf leading to said loop and spaced therefrom, and
   c. a pair of projections formed along the edges of said uppermost leaf on the underside and extending around a curved portion of said eye, said projections strengthening said eye, said lower leaf being slidably located between said projections and limited to lengthwise movement with respect to said uppermost leaf by lateral edges of said lower leaf abutting said projections.

2. A multi-leaf spring comprising:
   a. an uppermost leaf, said uppermost leaf having a main length, an end portion and an eye curled from said end portion, said eye enclosing a sleeve and a bush for a shackle,
   b. a lower leaf, said lower leaf having a main length, and an end portion and a loop bent from said end portion and extending around said eye, said loop being elongated in the lengthwise direction of the spring leaves to provide a part parallel to said main length of said lower leaf leading to said loop and spaced therefrom, and
   c. a pair of projections formed on said uppermost leaf below said eye, said lower leaf being slidably located between said projections and limited to lengthwise movement with respect to said uppermost leaf, wherein said projections are ribs extending along edges of said uppermost leaf in both directions from the underside of said eye.

3. A multi-leaf spring comprising:
   a. an uppermost leaf, said uppermost leaf having a main length, an end portion and an eye curled from said end portion, said eye enclosing a sleeve and a bush for a shackle,
   b. a lower leaf, said lower leaf having a main length, and an end portion and a loop bent from said end portion and extending around said eye, said loop being elongated in the lengthwise direction of the spring leaves to provide a part parallel to said main length of said lower leaf leading to said loop and spaced therefrom, and
   c. a pair of projections formed on said uppermost leaf below said eye, said lower leaf being slidably located between said projections and limited to lengthwise movement with respect to said uppermost leaf, wherein the thickness of said uppermost leaf is increased in both directions from the underside of said eye.

* * * * *